June 17, 1941.　　　H. B. SNYDER　　　2,246,018
POWER TRANSMISSION
Filed Jan. 15, 1940　　　2 Sheets-Sheet 1
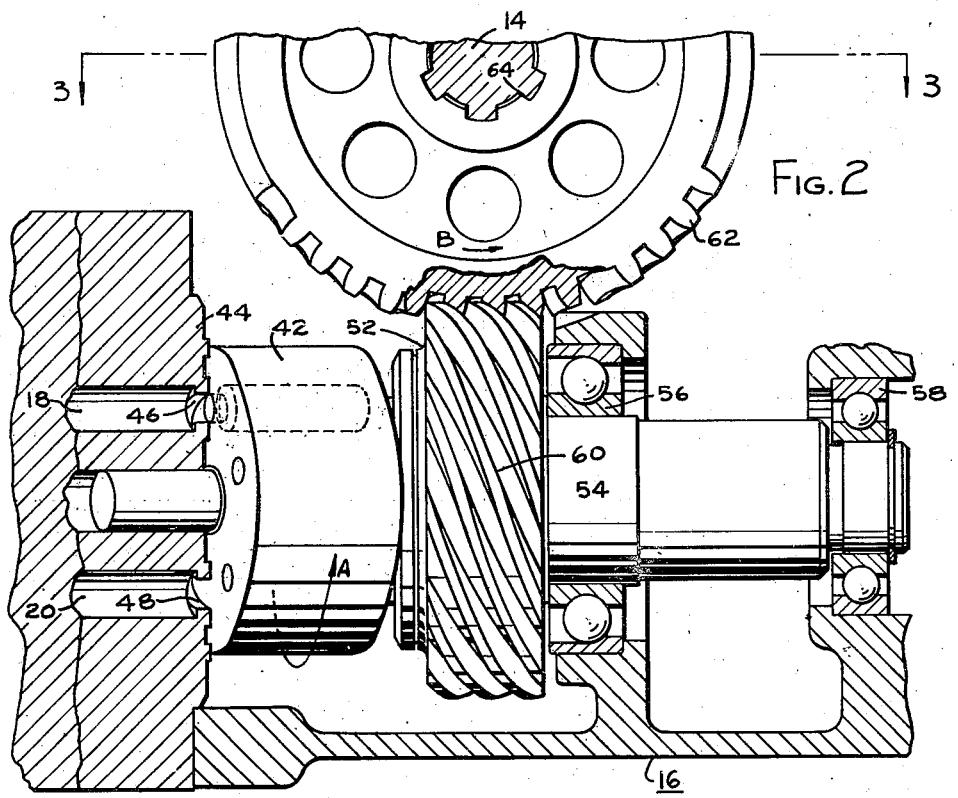
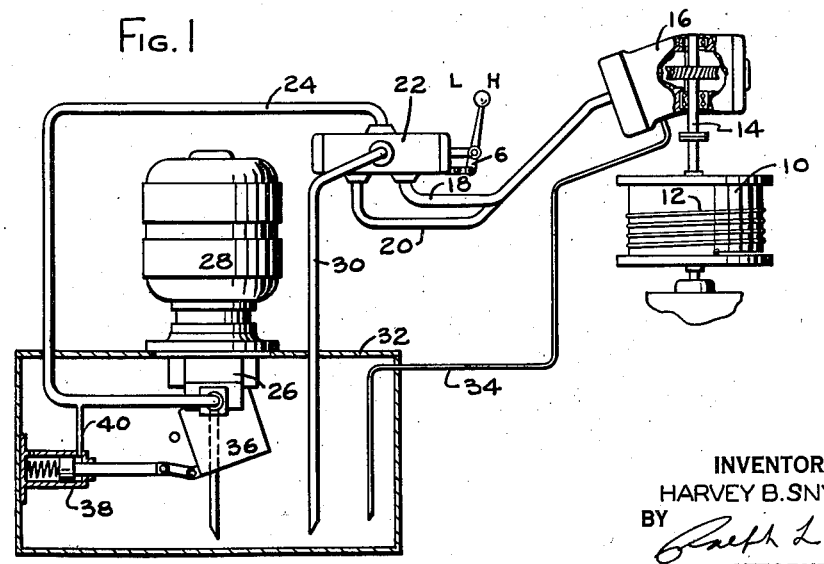
INVENTOR
HARVEY B. SNYDER
BY
ATTORNEY June 17, 1941.   H. B. SNYDER   2,246,018
POWER TRANSMISSION
Filed Jan. 15, 1940   2 Sheets-Sheet 2

INVENTOR
HARVEY B. SNYDER
BY
ATTORNEY

Patented June 17, 1941

2,246,018

UNITED STATES PATENT OFFICE 2,246,018

POWER TRANSMISSION

Harvey B. Snyder, Detroit, Mich., assignor to Vickers Incorporated, Detroit, Mich., a corporation of Michigan Application January 15, 1940, Serial No. 313,867

8 Claims. (Cl. 74—189.5)

This invention relates to power transmissions and more particularly to those of the type comprising two or more fluid pressure energy translating devices, one of which may function as a pump and another as a fluid motor.

The invention is particularly concerned with a hydraulic drive unit especially adapted for connection to a unidirectionally acting load device, for example, a hoist. Hydraulic motors of the type which include a cylinder barrel with axially aligned cylinders and which rotates on an axis inclined to the axis of the driving shaft require extremely rugged thrust bearings for the driving shaft or other reaction member which receives the piston thrust and converts it into a tangential component creating torque on the driving shaft. The bearing problem is further complicated by the fact that the center of piston thrust on the reaction member is not concentric to the reaction member axis and thereby loads the thrust bearings eccentrically.

It is an object of the present invention to provide an improved hydraulic drive system utilizing a motor of the type described wherein provision is made for applying a counter-thrust directly to the reaction member and in opposition to the piston thrust, thereby relieving a considerable portion of the end thrust on the bearings which support the reaction member.

A further object is to provide a hydraulic drive system wherein a hydraulic motor of the type which produces substantial end thrust on its drive shaft may be combined with drive gearing in such a manner that a substantial portion of the thrust is opposed by the reaction thrust of the gearing.

Further objects and advantages of the present invention will be apparent from the following description, reference being had to the accompanying drawings wherein a preferred form of the present invention is clearly shown.

In the drawings:

Figure 1 is a diagrammatic view of a power transmission system incorporating a preferred form of the present invention.

Figure 2 is a fragmentary sectional view of a hydraulic motor and gearing forming part of the drive system of Figure 1.

Figure 3:
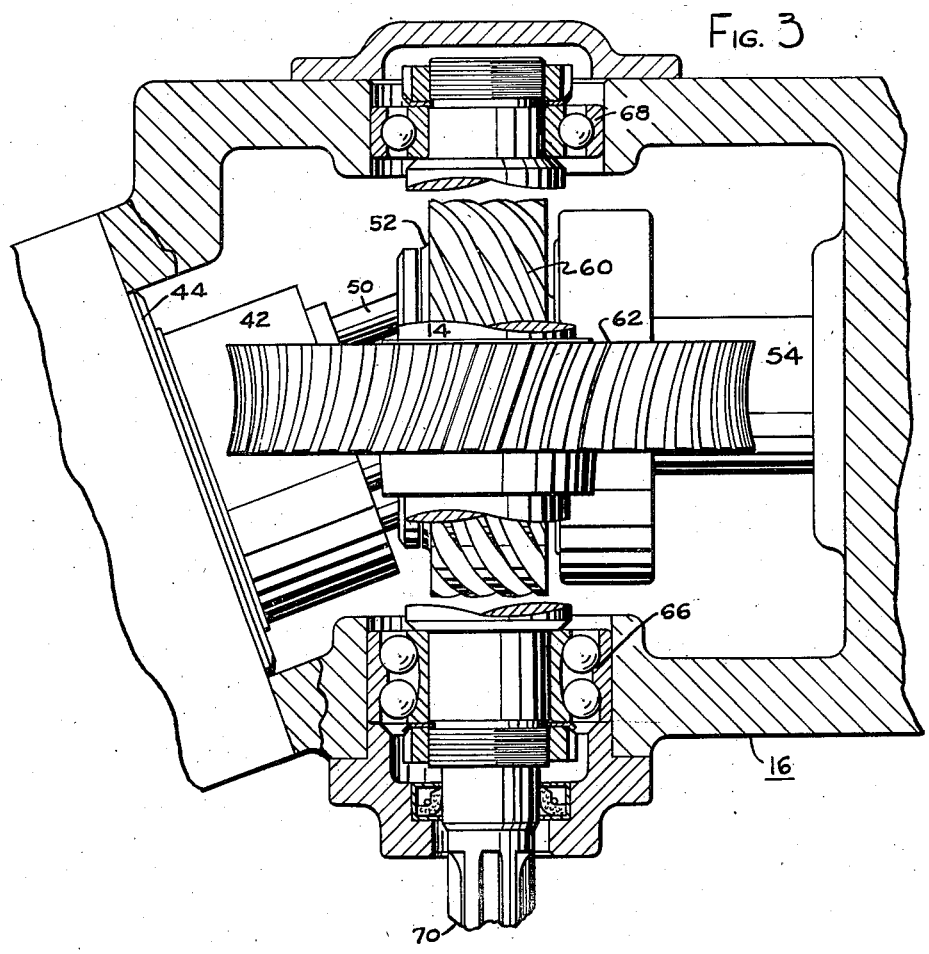
Figure 3 is a fragmentary sectional view taken on line 3—3 of Figure 2.

Referring now to Figure 1, there is illustrated a load device comprising a winch drum 10 having a load-lifting cable 12 wound thereon. The winch is representative of load devices which are unidirectional in their action, that is, which impose a torque that always acts in the same direction regardless of the direction of rotation.

The winch drum 10 is driven from an output shaft 14 of a hydraulic motor 16. The latter has the usual supply and return pipes 18 and 20 which connect with the motor ports of a conventional four-way reverse valve 22. The latter has its pressure port connected by a conduit 24 with a suitable source of pressure fluid such as a pump 26 driven by an electric motor 28. The return port of the valve 22 connects by a conduit 30 with a liquid reservoir or tank 32. A suitable drain conduit 34 is also provided for draining seepage from the interior of the casing of the motor 16 to the tank 32.

The pump 26 may be of any suitable type and is illustrated diagrammatically as of the class having a swinging yoke 36 which may be adjusted to various angles of inclination with respect to the pump driving shaft for varying the stroke of the pump pistons. A suitable pressure regulator 38 may be provided for automatically regulating the stroke of the pump 26 as determined by the pressure in conduit 24 transmitted through a branch conduit 40 to the regulator 38.

The fluid motor 16 comprises the usual elements of an axial piston type hydraulic motor, including a revolving cylinder barrel 42 having the usual cylinders and pistons reciprocably mounted therein. The barrel 42 revolves against a valve plate 44 having diametrically opposite arcuate supply and return ports 46 and 48 which connect with the conduits 18 and 20 respectively. Each of the pistons in the barrel 42 is articulated by the usual ball-jointed connecting rods 50 to a reaction member 52 formed as an integral flange on the drive shaft 54. The latter is journalled in suitable anti-friction bearings 56 and 58 on an axis inclined to the axis of rotation of the barrel 42 as is apparent from Figure 3. The construction thus far described is of conventional type, and for further disclosure of its detailed operation reference may be had to the patent to Thoma, 1,931,969.

For the purpose of connecting the reaction member 52 to the load device 10 in such a manner as to relieve a substantial portion of the end thrust on the bearing 56, the reaction member 52 is provided with a worm gear 60 formed on its outer periphery and preferably integral therewith. The helix angle of the worm 60 is preferably, though not necessarily, equal to the angle between the axis of the shaft 54 and the axis of cylinder barrel 42. The worm 60 meshes with a worm wheel 62 secured to the output shaft 14 as by splines 64. The shaft 14 is journalled in the motor casing on anti-friction bearings 66 and 68 and has a projecting splined extension 70 to which the shaft of the winch 10 is coupled by suitable means.

In operation, with the pump 26 running and with the valve 22 shifted to admit pressure fluid from conduit 24 to conduit 18, such fluid is delivered into port 46 of the motor 16 and causes rotation of the reaction member 52 and cylinder barrel 42 in the direction of the arrow A of Figure 2. The worm 60 accordingly drives the worm wheel 62 in the direction of the arrow B in Figure 2 thus driving the winch 10 and lifting the load connected to the cable 12. Fluid discharged from the motor 16 through port 48 returns to tank through conduit 20, valve 22 and conduit 30 in the usual way.

The winch may be rotated in the opposite direction to lower the load by shifting the valve 22 to connect conduit 18 with the tank conduit 30 thus permitting the weight of the load to turn the motor backwards acting as a pump withdrawing fluid from the port 48 and delivering it into port 46. It will be noted, however, that under these conditions, the pressure in port 46 remains higher than that in port 48 by an amount proportional to the weight of the load.

Figure 4:
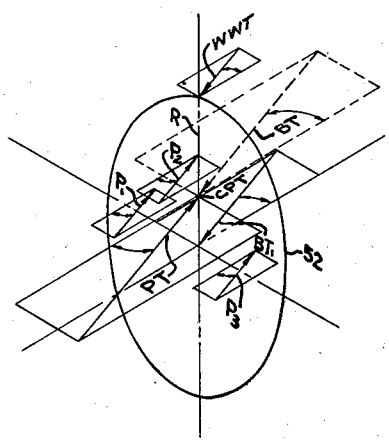
Figure 4 is a diagram of the thrust forces applied to the mechanism of Figures 2 and 3.

Referring now to Figure 4, the various forces which act on the reaction member 52 are there shown diagrammatically. Assuming the cylinder barrel 42 to have five cylinders and pistons and that at a given instant three of them are in register with the arcuate pressure port 46, the fluid pressure in that port acting against the head of the three pistons will produce three forces designated $p_1$, $p_2$ and $p_3$. These forces act in directions which are parallel to the axis of the barrel 42 and represent actual thrusts in this direction imposed on the reaction member 52. The latter is represented as a disk of negligible thickness in Figure 4. The sum of the three forces $p_1$, $p_2$ and $p_3$ is designated as PT and acts in a direction parallel to the three smaller forces and at a point CPT which represents the imaginary center of piston thrust.

It will be seen that in previous devices where the drive to the load device is taken from the end of the shaft 54 that the entire thrust represented by the force PT must be counterbalanced by an equal and opposite thrust BT shown dotted in Figure 4 and which represents the thrust load on the bearings 56 in a conventional type of device.

By the present improvement the worm 60 in driving the worm wheel 62 meets a counter-force represented by the arrow WWT in Figure 4, the direction of which is substantially normal to the side faces of the worm teeth. Thus if the helix angle of the worm be equal to the angle of inclination of the barrel 42 relative to the shaft 54, the force WWT will act in a direction parallel to that of the piston thrust PT. By locating the output shaft 14 in the position illustrated, the forces WWT and PT are also lying in a line R which is radial with respect to the axis of reaction member 52.

Since the worm wheel counter-thrust does not act at the point CPT, the thrust bearing 56 must provide additional counter-thrust in order to have the reaction member 52 in equilibrium. This force is represented by the arrow $BT_1$ which acts at the geometrical center of the reaction member 52. It will be noted that the magnitude of the bearing thrust $BT_1$ is considerably less than that of the prior art bearing thrust BT since it is always equal to the piston thrust PT minus the worm wheel thrust WWT. Furthermore the bearing thrust $BT_1$ acts at the shaft axis and not at the point CPT eccentric thereto.

It will thus be seen that the present improvement greatly diminishes the magnitude of the thrust load on the bearings which support the reaction member and also eliminates entirely the eccentricity of such loading which occurs with devices of the prior art. In other words, the present device relieves a substantial part of the bearing load by transferring the driving forces directly from the reaction member to the load driving member at a point and in a direction such that the load reaction directly opposes the piston thrust.

It will be understood that the analysis above given is somewhat simplified in order to clarify the principles involved. In actual practice, where designing a drive system of this character, the designer may obviously apply such refinements and corrections as are usually applied giving due regard to such factors as friction in the gearing, thickness of the reaction member, and other factors which have been ignored in the present analysis for the sake of clarity.

While the form of embodiment of the invention as herein disclosed constitutes a preferred form, it is to be understood that other forms might be adopted, all coming within the scope of the claims which follow.

What is claimed is as follows:

1. In a hydraulic drive system for a unidirectionally acting load device the combination of a reciprocating piston hydraulic motor of the type having a reaction member for receiving piston thrust and rotatable on an axis inclined with respect to the direction of piston reciprocation, an output shaft mounted transverse to and spaced from the axis of rotation of the reaction member, and worm gearing connecting the reaction member with the output shaft and arranged to oppose the piston thrust by the counter-thrust of the worm.

2. In a hydraulic drive system for a unidirectionally acting load device the combination of a reciprocating piston hydraulic motor of the type having a reaction member for receiving piston thrust and rotatable on an axis inclined with respect to the direction of piston reciprocation, an output shaft mounted transverse to and spaced from the axis of rotation of the reaction member, and worm gearing connecting the reaction member with the output shaft and arranged to oppose the piston thrust by the counter-thrust of the worm, the helix angle of the worm being substantially equal to the angle of inclination of the axis of rotation of the reaction member with respect to the direction of piston reciprocation.

3. In a hydraulic drive system for a unidirectionally acting load device the combination of a reciprocating piston hydraulic motor of the type having a reaction member for receiving piston thrust and rotatable on an axis inclined with respect to the direction of piston reciprocation, an output shaft mounted transverse to and spaced from the axis of rotation of the reaction member, and worm gearing connecting the reaction member with the output shaft and arranged to oppose the piston thrust by the counter-thrust of the worm, the helix angle of the worm being substantially equal to the angle of inclination of the axis of rotation of the reaction member with respect to the direction of piston reciprocation, the output shaft having its axis lying in a plane parallel to the plane of said angle of inclination.

4. In a hydraulic drive system the combination of a reciprocating motor of the type having a revolving cylinder barrel with axially arranged cylinders and a reaction member for receiving piston thrust and rotatable on an axis at an angle of inclination to the barrel axis, an output shaft, and gearing between the reaction member and the output shaft and arranged to transmit to the reaction member a thrust in opposition to the piston thrust.

5. In a hydraulic drive system the combination of a reciprocating hydraulic motor of the type having a revolving cylinder barrel with axially arranged cylinders and a reaction member for receiving piston thrust and rotatable on an axis at an angle of inclination to the barrel axis, an output shaft, and gearing between the reaction member and the output shaft and arranged to transmit to the reaction member a thrust in opposition to the piston thrust, the center of gear thrust on the reaction member and the center of piston thrust on the reaction member being in alignment radially of the reaction member.

6. In a hydraulic drive system for a unidirectionally acting load device the combination of a reciprocating piston hydraulic motor of the type having a reaction member for receiving piston thrust and rotatable on an axis inclined with respect to the direction of piston reciprocation, an output shaft mounted transverse to and spaced from the axis of rotation of the reaction member, and worm gearing connecting the reaction member with the output shaft and arranged to oppose the piston thrust by the counter-thrust of the worm, said gearing including a worm formed integrally on the periphery of the reaction member.

7. In a hydraulic drive system the combination of a reciprocating hydraulic motor of the type having a revolving cylinder barrel with axially arranged cylinders and a reaction member for receiving piston thrust and rotatable on an axis at an angle of inclination to the barrel axis, an output shaft, and gearing between the reaction member and the output shaft and arranged to transmit to the reaction member a thrust in opposition to the piston thrust, said gearing including a gear formed integrally on the periphery of the reaction member.

8. In a hydraulic drive system the combination of a reciprocating hydraulic motor of the type having a revolving cylinder barrel with axially arranged cylinders and a reaction member for receiving piston thrust and rotatable on an axis at an angle of inclination to the barrel axis, and means for driving a load device from the reaction member, said means transmitting the driving action and the load reaction on the reaction member in a direction substantially parallel to the axis of the cylinder barrel.

HARVEY B. SNYDER.